(12) United States Patent
Jeong et al.

(10) Patent No.: US 9,791,041 B2
(45) Date of Patent: Oct. 17, 2017

(54) APPARATUS FOR CONTROLLING AUTOMATIC TRANSMISSION AND METHOD THEREOF

(71) Applicants: Hyundai Motor Company, Seoul (KR); Kia Motors Corporation, Seoul (KR)

(72) Inventors: Dong Hoon Jeong, Osan-si (KR); Chong Tae Yang, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 67 days.

(21) Appl. No.: 14/946,333

(22) Filed: Nov. 19, 2015

(65) Prior Publication Data

US 2017/0045138 A1 Feb. 16, 2017

(30) Foreign Application Priority Data

Aug. 12, 2015 (KR) .................. 10-2015-0113993

(51) Int. Cl.
*F16H 61/06* (2006.01)
*F16H 61/04* (2006.01)
(Continued)

(52) U.S. Cl.
CPC ............. *F16H 61/06* (2013.01); *F16H 59/18* (2013.01); *F16H 59/20* (2013.01);
(Continued)

(58) Field of Classification Search
CPC ........... Y10T 477/689; Y10T 477/6895; Y10T 477/692; Y10T 477/69373; F16H 61/0213;
(Continued)

(56) References Cited

U.S. PATENT DOCUMENTS 6,068,576 A * 5/2000 Tsutsui .................. F16H 61/061
477/132
2002/0151409 A1* 10/2002 Hayabuchi ............ F16H 61/061
477/158
(Continued)

FOREIGN PATENT DOCUMENTS

JP H09-329225 A 12/1997
JP 2014214865 11/2014
(Continued)

*Primary Examiner* — Roger L Pang
(74) *Attorney, Agent, or Firm* — Brinks Gilson & Lione

(57) ABSTRACT

An automatic transmission control apparatus includes an engine generating power by a combustion of fuel; an automatic transmission provided with a friction element including a clutch and a brake and changing the power generated in the engine into a torque required depending on a speed by an engagement and release of the friction element to be output; an accelerator pedal position sensor detecting a position signal of the accelerator pedal; and a controller determining whether a vehicle is in a rapid acceleration state from the position signal of the accelerator pedal detected from the accelerator pedal position sensor and correcting a control hydraulic pressure of the friction element if the vehicle is the rapid acceleration state. Since the friction element control hydraulic pressure is controlled depending on the operation speed of the accelerator pedal, the shift responsiveness may be improved.

10 Claims, 4 Drawing Sheets

(51) Int. Cl.
*F16H 59/18* (2006.01)
*F16H 59/20* (2006.01)

(52) U.S. Cl.
CPC ............... *F16H 2059/183* (2013.01); *F16H 2061/0492* (2013.01); *Y10T 477/689* (2015.01); *Y10T 477/6895* (2015.01); *Y10T 477/692* (2015.01)

(58) Field of Classification Search
CPC ..... F16H 2061/0216; F16H 2061/0492; F16H 61/06; F16H 59/18; F16H 2059/183; F16H 59/20
See application file for complete search history.

(56) References Cited

U.S. PATENT DOCUMENTS

| | | | |
|---|---|---|---|
| 2008/0070751 A1* | 3/2008 | Jung ................... | F16H 61/143 477/174 |
| 2013/0096786 A1* | 4/2013 | Jang ..................... | F16H 59/18 701/53 |
| 2014/0129103 A1* | 5/2014 | Tohta ................... | F02D 41/022 701/67 |
| 2014/0365093 A1* | 12/2014 | Tsuda ................... | B60K 6/48 701/60 |

FOREIGN PATENT DOCUMENTS

| KR | 10-2009-0028508 A | 3/2009 |
|---|---|---|
| KR | 100976947 | 8/2010 |

\* cited by examiner

APPARATUS FOR CONTROLLING AUTOMATIC TRANSMISSION AND METHOD THEREOF

CROSS-REFERENCE TO RELATED APPLICATIONS

This application claims the benefit of Korean Patent Application No. 10-2015-0113993, filed on Aug. 12, 2015, the contents of which are incorporated herein by reference in its entirety.

FIELD

The present disclosure relates to an apparatus for controlling an automatic transmission and a method thereof.

BACKGROUND

The statements in this section merely provide background information related to the present disclosure and may not constitute prior art.

Generally, a vehicle is provided with a transmission which receives power generated from an engine to control a driving speed of a vehicle. The transmission is classified into a manual transmission which is controlled by a driver and an automatic transmission which is automatically controlled based on a driving speed of a vehicle.

The automatic transmission allows a shift controller to drive a plurality of solenoid valves based on a driving speed of the vehicle, an open value of a throttle valve, and general detection conditions so as to control an oil pressure, such that a transmission gear of a target gear stage is operated to perform the automatic shift.

When the driver operates the accelerator pedal, if the operation amount of the accelerator pedal is increased (for example, a situation that the vehicle is suddenly accelerated), the torque transmitted to a wheel through a kick down shift) is increased, accordingly the acceleration of the vehicle is increased.

According to the conventional art, the control hydraulic pressure of the clutch is determined based on the engine torque. If the accelerator pedal operation amount is increased, since the engine torque is also increased, the driver may control the acceleration and the shift responsiveness of the vehicle depending on the accelerator pedal operation amount.

On the other hand, recently, the engine including a turbocharger is widely supplied. In the engine including the turbocharger, when accelerating the vehicle in the low-speed range, the torque increasing is delayed by a turbo lag. Accordingly, regardless of the operation amount and the operation speed of the accelerator pedal, since the engine torque is small, the acceleration and the shift response speed of the vehicle may be delayed.

SUMMARY

The present disclosure provides an automatic transmission control apparatus controlling a friction element control hydraulic pressure of the automatic transmission by using the accelerator pedal operation speed of the driver and a method thereof.

An automatic transmission control apparatus according to one form of the present disclosure includes an engine generating a power by a combustion of fuel; an automatic transmission provided with a friction element including a clutch and a brake and changing the power generated in the engine into a desired torque depending on a speed by an engagement and release of the friction element to be output; an accelerator pedal position sensor detecting a position signal of the accelerator pedal; and a controller determining whether a vehicle is in a rapid acceleration state from the position signal of the accelerator pedal detected from the accelerator pedal position sensor and correcting a control hydraulic pressure of the friction element if the vehicle is the rapid acceleration state.

The controller may determine the rapid acceleration state of the vehicle by using an interpolation signal that the position signal of the accelerator pedal detected from the accelerator pedal position sensor and the position signal of the accelerator pedal are interpolated.

The controller may calculate a correction hydraulic pressure that a correction amount is subtracted from the control hydraulic pressure if a difference of the position signal of the accelerator pedal in the shift timing and the interpolation signal is a predetermined value or more and may release the friction element depending on the correction hydraulic pressure.

The controller may increase the correction amount step-by-step as the difference of the position signal of the accelerator pedal and the interpolation signal is increased.

The controller may filter the accelerator pedal position signal through a low pass filter to calculate the interpolation signal.

The correction hydraulic pressure may be stored to the controller in a map data depending on a difference of the change amount of the accelerator pedal and the interpolation signal.

An automatic transmission control method according to another form of the present disclosure includes detecting a position signal of an accelerator pedal detected from an accelerator pedal position sensor; calculating an engine torque depending on the accelerator pedal position signal; setting a control hydraulic pressure for a friction element release of the automatic transmission depending on the engine torque; determining whether the vehicle is in a rapid acceleration state from the position signal of the accelerator pedal; calculating a correction hydraulic pressure that the control hydraulic pressure is corrected if the vehicle is the rapid acceleration state; and releasing the friction element depending on the correction hydraulic pressure.

In the step determining whether the vehicle is the rapid acceleration state, the rapid acceleration state of the vehicle may be determined by using an interpolation signal that the position signal of the accelerator pedal and the position signal of the accelerator pedal are interpolated.

It may be determined that the vehicle is the rapid acceleration state if the difference of the position signal of the accelerator pedal and the interpolation signal is a predetermined value or more in a shift timing.

The correction hydraulic pressure may be calculated by subtracting the correction amount from the control hydraulic pressure.

The correction amount may be increased as the difference of the position signal of the accelerator pedal and the interpolation signal is increased.

According to the automatic transmission control apparatus according to one form of the present disclosure, since the friction element control hydraulic pressure is controlled depending on the operation speed of the accelerator pedal, the shift responsiveness may be improved.

Also, since the friction element control hydraulic pressure is controlled through the difference of the operation signal of the accelerator pedal and the interpolation signal that the operation signal of the accelerator pedal is interpolated, the influence of the noise may be reduced when controlling the friction element control hydraulic pressure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
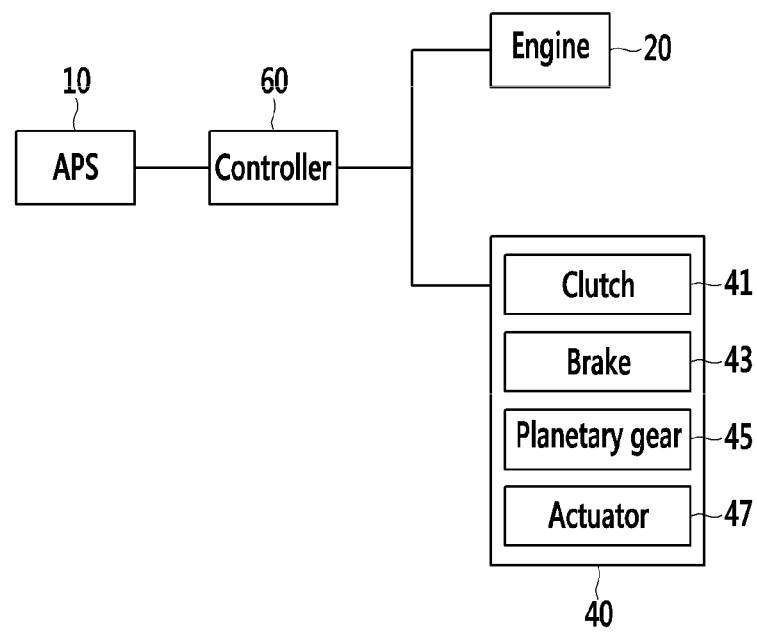
FIG. 1 is a block diagram of a configuration of an automatic transmission control apparatus according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a block diagram of a configuration of an automatic transmission control apparatus according to one form of the present disclosure.

As shown in FIG. 1, an automatic transmission control apparatus according to one form of the present disclosure includes an engine 20 generating a power, an automatic transmission 40 provided with a friction element including a clutch 41 and a brake 43 and changing the power generated in the engine by an engagement and a release of the friction element into the desired torque depending on the speed to be output, an accelerator pedal position sensor 10 (APS) detecting the position signal of the accelerator pedal, and a controller 60 controlling the engine 20, the transmission 40, and the friction element 41 and 43.

The controller 60 may be implemented by one or more processors operated by a predetermined program, in which the predetermined program is set to perform steps of the control method of the automatic transmission according to one form of the present disclosure.

The controller 60 may include an ECU (engine control unit) controlling the engine 20 and a TCU (transmission control unit) controlling the automatic transmission 40.

The accelerator pedal position sensor 10 detects the position of the accelerator pedal depending on a tip in/tip out of the accelerator pedal and converts the information for the position of the accelerator pedal into an electric signal to be provided to the controller 60.

The transmission 40 as the automatic transmission 40 changes the power transmitted from the engine 20 into the torque desired depending on the speed to be output. The automatic transmission 40 includes one planetary gear set 45 to change and output the input speed of the automatic transmission 40 into a target rotation speed.

Also, in the automatic transmission 40, at least one friction element (for example, a clutch or a brake) to selectively connect operation members of the planetary gear set 45 to an input shaft, a transmission case (not shown), or other operation members.

The controller 60 controls the control hydraulic pressure for the engagement and release of the friction elements 41 and 43, thereby automatically realizing a shift speed to the target shift-speed. That is, the controller outputs the control hydraulic pressure for the engagement and release of the friction element 41 and 43 to the actuator 47.

The actuator 47 includes at least one control valve and solenoid valve controlling the hydraulic pressure applied to the friction element 41 and 43.

The controller 60 may determine an acceleration will of the driver through the output value (the position signal of the accelerator pedal) output from the accelerator pedal position sensor 10. For example, if the magnitude of the position signal of the accelerator pedal is sharply increased, it may be determined that the driver suddenly accelerates the vehicle (a situation that the kick down shift is required). Also, if the magnitude of the position signal of the accelerator pedal is smoothly increased, it may be determined that the driver smoothly accelerates the vehicle (a situation that the kick down shift is not required).

The controller 60 calculates the engine torque from the position signal of the accelerator pedal detected from the accelerator pedal position sensor 10. Also, the controller 60 sets the control hydraulic pressure for the release of the friction element 41 and 43 depending on the current vehicle speed and the engine torque.

The controller 60 determines whether the vehicle is the rapid acceleration state (kick down shift) from the position signal of the accelerator pedal. If the vehicle is the rapid acceleration state, the controller 60 corrects the control hydraulic pressure for the release of the friction element 41 and 43.

In detail, the controller 60 calculates the interpolation signal that the position signal of the accelerator pedal detected from the accelerator pedal position sensor 10 is interpolated. Also, it is determined whether the vehicle is the rapid acceleration state (the situation that the kick down shift is required) by using the position signal of the accelerator pedal and the interpolation signal.

For example, if a difference of the position signal of the accelerator pedal and the interpolation signal is more than a predetermined value in a shift timing of the transmission 40, the controller 60 determines that the vehicle is the rapid acceleration state. Also, the controller 60 calculates a correction hydraulic pressure by subtracting the correction amount from the control hydraulic pressure for the release of the friction element 41 and 43.

In this case, the correction amount is set to be increased as the difference between the position signal of the accelerator pedal and the interpolation signal is increased. That is, the magnitude of the correction hydraulic pressure is decreased step-by-step rather than the magnitude of the control hydraulic pressure determined by the vehicle speed and the engine torque.

When calculating the interpolation signal, the controller 60 may filter the position signal of the accelerator pedal through a low pass filter (LPF) to calculate the interpolation signal.

Hereinafter, an operation of the automatic transmission control apparatus according to one form of the present disclosure will be described with reference to accompany drawings.

Figure 2:
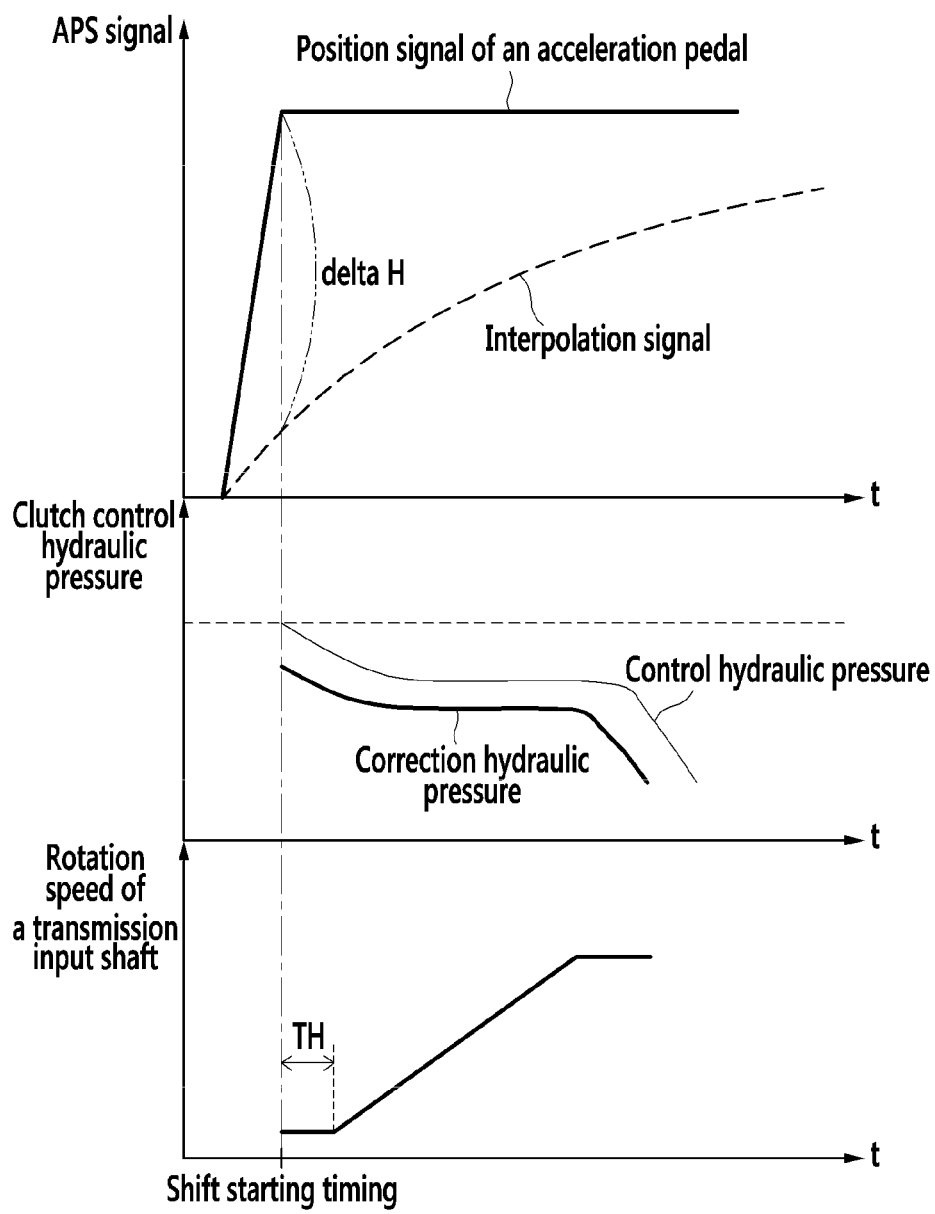
FIG. 2 and FIG. 3 are graphs showing an input shaft rotation speed, accelerator pedal operation signal and friction element control hydraulic pressure of a transmission according to one form of the present disclosure.
Figure 3:
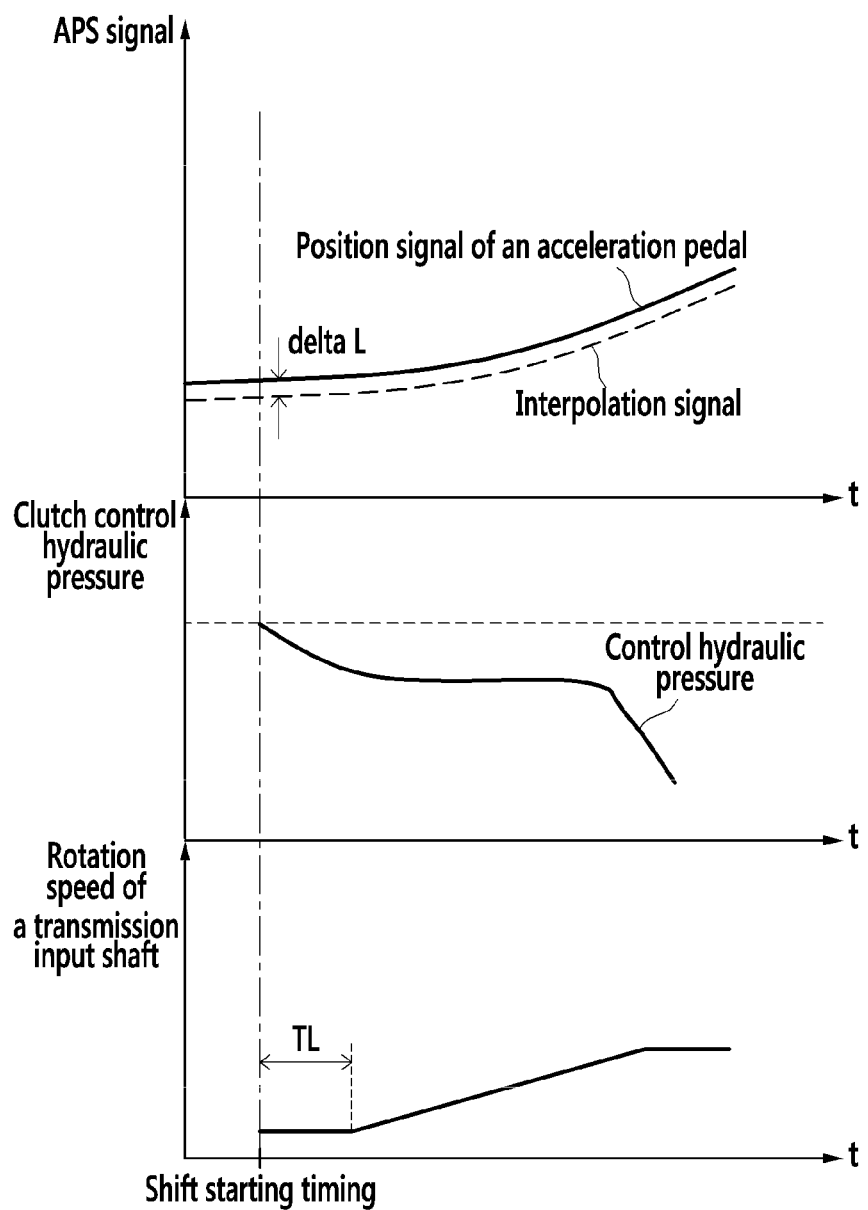

FIG. 2 and FIG. 3 are graphs showing an input shaft rotation speed, accelerator pedal operation signal and friction element control hydraulic pressure of a transmission 40 according to one form of the present disclosure. FIG. 2 is the graph showing the input shaft rotation speed, the accelerator pedal operation signal, and the clutch control hydraulic pressure of the transmission 40 when the vehicle is suddenly accelerated, and FIG. 3 is the graph showing the input shaft rotation speed, the accelerator pedal operation signal, and the clutch control hydraulic pressure of the transmission 40 when the vehicle is smoothly accelerated.

Hereinafter, the automatic transmission control method that the vehicle is the smooth acceleration state and the automatic transmission control method that the vehicle is the rapid acceleration state will be described in detail.

Referring to FIG. 2, the controller 60 filters the position signal of the accelerator pedal through the low pass filter to calculate the interpolation signal.

If the driver sharply steps on the accelerator pedal for the rapid acceleration of the vehicle, the accelerator pedal position signal output from the accelerator pedal sensor forms a shape like a step input. If the accelerator pedal position signal is filtered through the low pass filter, the interpolation signal of the accelerator pedal position signal is delayed by a predetermined time than the original accelerator pedal position signal, thereby forming a following shape.

In this case, a difference delta H of the accelerator pedal position signal and the interpolation signal is larger than a predetermined value. In this case, the control hydraulic pressure to control the friction elements 41 and 43 is corrected, and the friction elements 41 and 43 are released by the correction hydraulic pressure. In this case, the correction hydraulic pressure is a value obtained by subtracting that the correction amount from a predetermined control hydraulic pressure.

If the correction hydraulic pressure is applied to the friction elements 41 and 43, since the correction hydraulic pressure is smaller than the control hydraulic pressure, the release speed of the friction elements 41 and 43 is faster. This phenomenon may be determined from the rotation speed of the input shaft of the transmission 40.

That is, as shown in FIG. 2, if the correction hydraulic pressure is applied to the friction elements 41 and 43, while the friction elements 41 and 43 are released, the rotation speed of the input shaft of the transmission 40 is sharply increased. In this case, since the magnitude of the correction hydraulic pressure is smaller than the magnitude of the control hydraulic pressure, a time TH that the friction elements 41 and 43 are released is shorten, and the rotation speed of the transmission input shaft is sharply increased.

As described above, when the vehicle is suddenly accelerated, as the friction elements 41 and 43 are released into the correction hydraulic pressure that the control hydraulic pressure to release the friction elements 41 and 43 is decreased into a predetermined pressure, the time TH required for releasing friction elements 41 and 43 may be shortened. Accordingly, the responsiveness by the accelerator pedal operation of the driver may be improved.

Referring to FIG. 3, the controller 60 filters the position signal of the accelerator pedal through the low pass filter, thereby calculating the interpolation signal.

If the driver smoothly steps on the accelerator pedal for the smooth acceleration of the vehicle, the accelerator pedal position signal output from the accelerator pedal sensor is formed with a shape that is smoothly increased. If the accelerator pedal position signal is filtered through the low pass filter, the interpolation signal of the accelerator pedal position signal is formed of the shape that is almost similar to the original accelerator pedal position signal.

In this case, the difference delta L of the accelerator pedal position signal and the interpolation signal is smaller than the predetermined value. Accordingly, the control hydraulic pressure to release the friction elements 41 and 43 is not corrected, and the control hydraulic pressure to control the friction elements 41 and 43 releases the friction elements 41 and 43 along the previously predetermined control hydraulic pressure.

As described above, in the case that the vehicle is suddenly accelerated (the case that the kick-down shift is not required), the friction elements 41 and 43 are released by the control hydraulic pressure determined from the vehicle speed and the accelerator pedal position signal. Accordingly, the time TL required for releasing the friction elements 41 and 43 is relatively long compared with when the vehicle is suddenly accelerated, and the rotation speed of the transmission input shaft is smoothly increased.

Hereinafter, the automatic transmission control method according to one form of the present disclosure will be described with reference to accompanying drawings.

Figure 4:
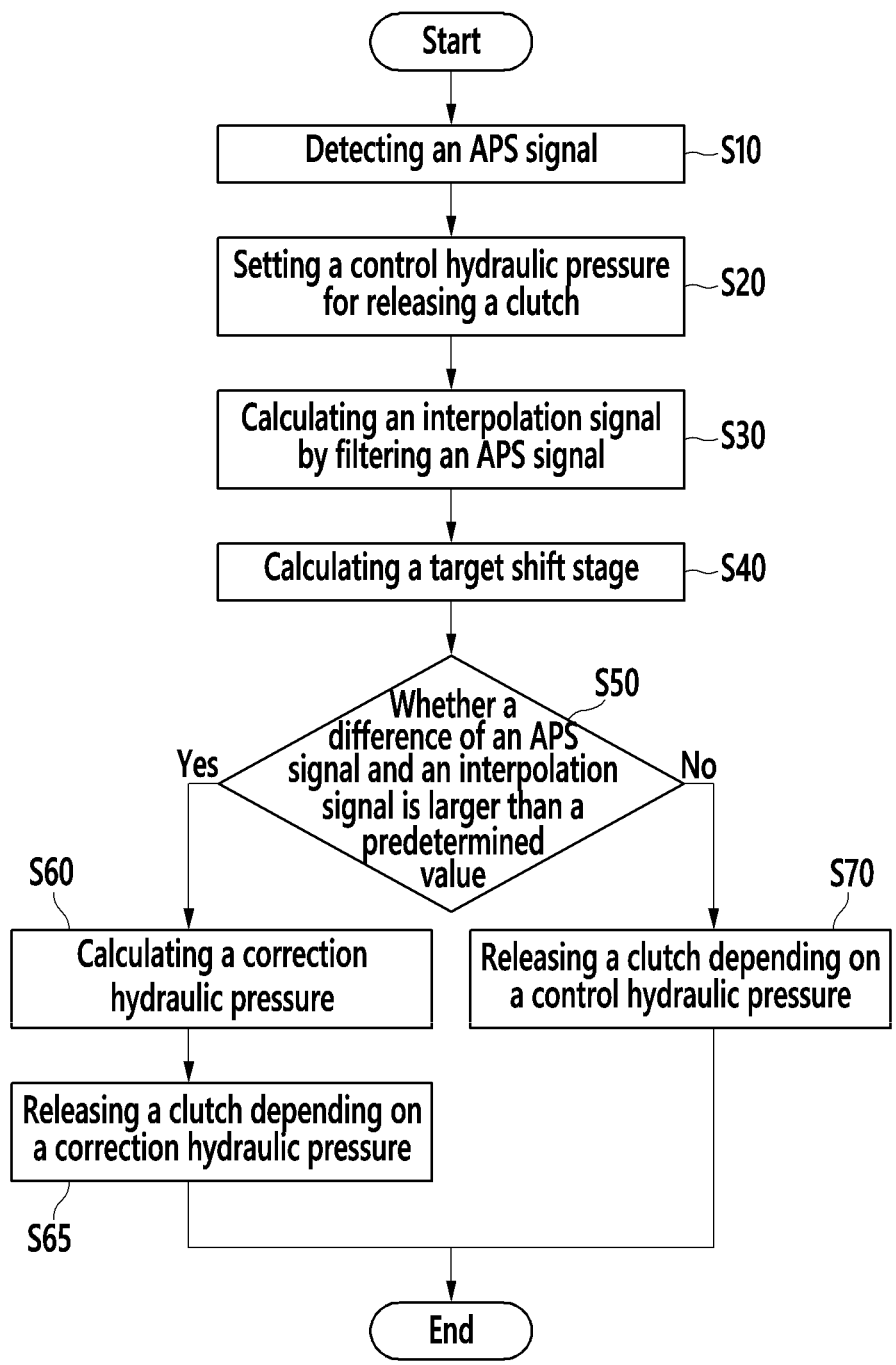
FIG. 4 is a flowchart showing a method for controlling an automatic transmission according to one form of the present disclosure.

FIG. 4 is a flowchart showing an automatic transmission control method according to one form of the present disclosure.

Referring to FIG. 4, the accelerator pedal position sensor 10 detects the position signal of the accelerator pedal and the position signal of the detected accelerator pedal is provided to the controller 60 (S10).

The controller 60 sets the control hydraulic pressure for the friction element release depending on the engine torque that is changed along the position signal of the accelerator pedal (S20). The control hydraulic pressure for the friction element release is stored to the controller 60 in the map data type along the engine torque.

The controller 60 filters the accelerator pedal position signal through the low pass filter to calculate the interpolation signal (S30).

The controller 60 sets a target shift state from the vehicle speed of the vehicle speed and the position signal of the accelerator pedal (S40). In this case, the target shift state is stored to the controller 60 in the map data type depending on the vehicle speed of the vehicle and the position signal of the accelerator pedal.

The controller 60 compares the accelerator pedal position signal and the interpolation signal and determines whether the difference of the accelerator pedal position signal and the interpolation signal is larger than the predetermined value (S50). If the difference of the accelerator pedal position signal and the interpolation signal is larger than the predetermined value, it is determined that the vehicle is the rapid acceleration state (the state that the kick-down is required).

If the difference of the accelerator pedal position signal and the interpolation signal is larger than the predetermined value, the controller 60 calculates the correction hydraulic pressure that the control hydraulic pressure for the friction element release is corrected (S60).

In this case, the controller 60 calculates the correction hydraulic pressure by subtracting the correction amount from the control hydraulic pressure. The correction amount is increased as the difference of the accelerator pedal position signal and the interpolation signal is increased. That is, if the difference of the accelerator pedal position signal and the interpolation signal is increased, the magnitude of the correction hydraulic pressure is decreased.

The correction amount to calculate the correction hydraulic pressure may be stored to the controller 60 in the map data type along the difference of the position signal of the accelerator pedal and the interpolation signal.

The controller 60 applies the correction hydraulic pressure to the friction elements 41 and 43 to release the friction elements 41 and 43 (S65).

If the differences of the accelerator pedal position signal and the interpolation signal is the predetermined value or less in the step S50, the controller 60 does not correct the control hydraulic pressure for the release of the friction element and applies the control hydraulic pressure calculated in the step S20 to the friction elements 41 and 43 to release the friction elements 41 and 43 (S70).

As described above, when the vehicle is suddenly accelerated (the kick-down shift), the correction hydraulic pressure that the control hydraulic pressure of the friction elements 41 and 43 is smaller than the previously predetermined control hydraulic pressure is applied to the friction elements 41 and 43, the time required for the release of the friction elements 41 and 43 is reduced. Accordingly, the responsiveness of the transmission 40 may be improved.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An automatic transmission control apparatus comprising:
    an engine generating a power by a combustion of fuel;
    an automatic transmission provided with a friction element including a clutch and a brake and changing the power generated in the engine into a desired torque depending on a speed by an engagement and release of the friction element to be output;
    an accelerator pedal position sensor detecting a position signal of an accelerator pedal; and
    a controller determining whether a vehicle is in a rapid acceleration state from the position signal of the accelerator pedal detected from the accelerator pedal position sensor and correcting a control hydraulic pressure of the friction element when the vehicle is in the rapid acceleration state,
    wherein the controller determines the rapid acceleration state of vehicle by using an interpolation signal, and the position signal of the accelerator pedal detected from the accelerator pedal position sensor is interpolated.

2. The automatic transmission control apparatus of claim 1, wherein:
    the controller calculates a correction hydraulic pressure that a correction amount is subtracted from the control hydraulic pressure when a difference of the position signal of the accelerator pedal in a shift timing and the interpolation signal is a predetermined value or more and releases the friction element depending on the correction hydraulic pressure.

3. The automatic transmission control apparatus of claim 2, wherein: the controller increases the correction amount step-by-step as the difference of the position signal of the accelerator pedal and the interpolation signal is increased.

4. The automatic transmission control apparatus of claim 1, wherein:
    the controller filters the accelerator pedal position signal through a low pass filter to calculate the interpolation signal.

5. The automatic transmission control apparatus of claim 2, wherein the correction hydraulic pressure is stored to the controller in a map data type depending on a difference of the change amount of the accelerator pedal and the interpolation signal.

6. An automatic transmission control method for a vehicle comprising:
    detecting a position signal of an accelerator pedal detected from an accelerator pedal position sensor;
    calculating an engine torque depending on the accelerator pedal position signal;
    setting a control hydraulic pressure for release of a friction element of the automatic transmission depending on the engine torque;
    determining whether the vehicle is in a rapid acceleration state from the position signal of the accelerator pedal;
    calculating a correction hydraulic pressure, wherein the control hydraulic pressure is corrected when the vehicle is in the rapid acceleration state; and
    releasing the friction element depending on the correction hydraulic pressure.

7. The automatic transmission control method of claim 6, wherein:
    in the step determining whether the vehicle is in the rapid acceleration state, the rapid acceleration state of the vehicle is determined by using the position signal of the accelerator pedal and an interpolation signal, wherein the position signal of the accelerator pedal is interpolated.

8. The automatic transmission control method of claim 7, wherein the rapid acceleration state of the vehicle is determined when a difference of the position signal of the accelerator pedal and the interpolation signal is a predetermined value or more in a shift timing.

9. The automatic transmission control method of claim 7, wherein:
    the correction hydraulic pressure is calculated by subtracting a correction amount from the control hydraulic pressure.

10. The automatic transmission control method of claim 9, wherein:
    the correction amount is increased as a difference of the position signal of the accelerator pedal and the interpolation signal is increased.

* * * * *